(12) United States Patent
Dendo

(10) Patent No.: US 10,060,463 B2
(45) Date of Patent: Aug. 28, 2018

(54) CLIP AND FASTENING STRUCTURE

(71) Applicant: NEWFREY LLC, New Britain, CT (US)

(72) Inventor: Masashi Dendo, Toyohashi (JP)

(73) Assignee: NEWFREY LLC, New Britain, CT (US)

( * ) Notice: Subject to any disclaimer, the term of this patent is extended or adjusted under 35 U.S.C. 154(b) by 88 days.

(21) Appl. No.: 15/065,151

(22) Filed: Mar. 9, 2016

(65) Prior Publication Data

US 2016/0265571 A1    Sep. 15, 2016

(30) Foreign Application Priority Data

Mar. 10, 2015 (JP) .................................. 2015-46679

(51) Int. Cl.
  *F16B 13/06* (2006.01)
  *F16B 19/10* (2006.01)
  *F16B 21/07* (2006.01)

(52) U.S. Cl.
  CPC ........ *F16B 13/063* (2013.01); *F16B 19/1081* (2013.01); *F16B 21/075* (2013.01)

(58) Field of Classification Search
  CPC ........................... F16B 21/075; F16B 19/1081
  USPC ............................... 411/45, 508–510; 24/297
  See application file for complete search history.

(56) References Cited

U.S. PATENT DOCUMENTS

| 2,898,798 | A | * | 8/1959 | Carno | ................. | F16B 19/1081 |
| | | | | | | 411/80.2 |
| 4,375,342 | A | * | 3/1983 | Wollar | ................. | F16B 19/1081 |
| | | | | | | 411/41 |
| 5,211,519 | A | | 5/1993 | Saito | | |
| 5,375,954 | A | * | 12/1994 | Eguchi | ................. | F16B 19/1081 |
| | | | | | | 411/41 |
| 7,607,875 | B2 | * | 10/2009 | Shinozaki | ........... | F16B 19/1081 |
| | | | | | | 411/21 |
| 8,419,330 | B2 | * | 4/2013 | Watanabe | ........... | F16B 19/1081 |
| | | | | | | 411/45 |
| 8,794,887 | B2 | | 8/2014 | Nishino | | |
| 8,882,421 | B2 | | 11/2014 | Sasaki | | |

(Continued)

OTHER PUBLICATIONS

European Search Report dated Jul. 26, 2016.

*Primary Examiner* — Gary W Estremsky
(74) *Attorney, Agent, or Firm* — Michael P. Leary

(57) ABSTRACT

A clip is provided with a pin and a main body having an opening for inserting the pin. The pin has a flange and a shaft extending down from the flange. The outer circumference of the flange curves downward. The main body has a bottom, a pair of latching claws downward from the bottom through the opening, support legs extending downward from the bottom between the latching claws, an annular loop element on the top side of the bottom, a sloping element of gradually lowering height from the outside annular element and annular thin-walled flange from the underside of the bottom. In the primary joined state, the latching claws pushing on the pin shaft spread apart, and the claw tips engage the pin latching convex element of the pin shaft. The attached member is held between the base elements of the latching claws and contact element on the under side of the bottom of the main body. The edge of the outer circumference of the pin flange is in contact with the inclined element of the main body, improving watertightness.

20 Claims, 13 Drawing Sheets

(56) References Cited

U.S. PATENT DOCUMENTS

2002/0026693 A1* 3/2002 Akema ............... F16B 19/1081
 24/453
2005/0152765 A1 7/2005 Kato
2013/0039717 A1* 2/2013 Sasaki ................. F16B 19/1081
 411/80.1

* cited by examiner

CLIP AND FASTENING STRUCTURE

CROSS-REFERENCE TO RELATED APPLICATION

This application claims priority from Japanese Patent Application No. 2014-046679, filed on Mar. 10, 2015, the disclosure of which is incorporated herein by reference.

BACKGROUND OF THE INVENTION

The invention pertains to a clip and member fastening structure used for installing attaching members such as bumper retainers, protectors or interior elements to attached members such as an automobile body panel and the like. More particularly, it pertains to a clip that fastens by pushing a pin into a main body and a member fastening structure that uses such a clip.

Generally, clips are used to install attaching members such as bumper retainers, protectors or interior elements to attached members such as an automobile body panel or the like. Several clips are known that consist of a combination of a pin and a main body (grommet), press fit the pin into an opening of the torso of the main body and, while expanding a latching claw equipped on the torso, latch on the attaching hole of the attached member.

This type of clip can install the attaching member to the attached member simply just by pushing the pin into the hollow space of the main body. The clip is also such that, after joining the pin and the main body, the pin and the main body may be detached by rotating the pin.

However, in order for the clip of prior art to latch the pin onto the main body reliably, it is necessary to apply strong force when pushing the pin into the main body. Also, sealing between the pin and main body is not sufficient so it cannot be used as a part if watertightness is required.

Patent Reference JP2011-202692 A concerns a clip that improves watertightness between the pin and main body of the clip. FIG. 1A is a cross-sectional drawing running along the central axis of the clip of Patent Reference 1; FIG. 1B is a cross-sectional drawing of the perpendicular to FIG. 1A. The clip of JP2011-202692 A is provided with a pin 5 and a grommet 4. The grommet 4 constitutes an element of a bumper retainer and the clip is attached to a base 2 (attached member) by insertion of the pin 5 into a lead-through hole of the grommet 4.

The grommet 4 has a jaw-like element 7 in contact with the base 2 and a leg 8 that extends down from the jaw-like element 7. The leg 8 has one pair of first leg elements 8a facing both sides of the central axis and one pair of second leg elements 8b at right angles with the first leg elements 8a.

The pin 5 has a head 5a, a thin-walled flange 5b extending outward from the head 5a and a shaft 9 extending down from the head 5a.

To attach the clip, the leg of the grommet 4 is inserted into the center hole of the packing 6. The shaft 9 of the pin 5 is inserted into the opening of the grommet 4 and then joined with the pin 5. While temporarily joined, the ends of the second leg elements 8b of the grommet 4 interpose the thin diameter element 9b of the shaft 9 of the pin 5. The first leg elements 8a of the grommet 4 are positioned on both sides of the cam 9c element of the shaft 9.

Then, when the head 5a of the pin is pushed into the grommet 4, the thick diameter element 9a of the shaft 9 pushes the first leg element 8a of the grommet 4 open (FIG. 1B). The base 2 is interposed between the bottom of the jaw-like element 7 and the expanding pair of first leg elements 8a and installed. The end 8d of the second leg element 8b of the grommet 4 is put into the convex element 9d of the shaft 9 of the pin 5 (FIG. 1A), and the shaft 9 of the pin 5 is fixed so that it does not move in an axial direction vis-à-vis the grommet 4.

In JP2011-202692 A, the flange 5a of the pin 5 is in contact with the projecting wall element 7b on top of the jaw-like element 7 of the grommet 4 and curving in the opposite direction. Because the fastening structure of JP2011-202692 A is closely attached between the flange 5b of the pin 5 and the jaw-like element 7 of the grommet 4, sealing and durability are improved.

In order to improve watertightness between the pin 5 and the grommet 4, it is necessary to push the flange 5b forcibly into the wall element 7b.

As shown in FIG. 1A, for the clip of JP2011-202692 A, the force F1 on the pin 5 and the force F2 pushing the flange 5b onto the wall element 7b are the same. Therefore, in order to improve watertightness, the force F1 pushing the pin 5 must be great because the force F2 pushing the flange 5b onto the wall element 7b is great.

If the adherence between the flange 5b and the wall element 7b is insufficient, water may possibly enter from the penetration path shown at W1.

Patent Reference JP2009-41673 A discloses a clip equipped with a shaft, a male member (pin) having a head provided on the tip of the shaft, a latching leg body that deforms elastically on the outside pushing on the shaft, and a female member (main body) having a restraining leg element forming a claw engaging with a corresponding hole formed on the shaft.

The clip of JP2009-41673 A obtains a coercive force after installation by means of the latching leg element, and, when the clip is installed, a restraining sensitivity is achieved by means of the standard leg element; so both sufficient coercive force and sufficient restraining sensitivity are obtained.

However, with the clip of JP2009-41673 A, even after it is attached, a gap opens between the head of the male member and ring-formed element of the pedestal of the female member, so that water may possibly penetrate from this gap. Because watertightness was not carefully considered for the clip of JP2009-41673 A, it cannot be utilized when watertightness is a requirement.

For this reason, a clip that can push a pin using little force and that has suitable water-tightness has been sought. The fastening structure elements that use such a clip have also been sought.

BACKGROUND OF THE INVENTION

Consequently, the object of the invention is to provide a clip that can push a pin using little force and that has suitable watertightness.

A particular object of the invention is to provide the fastening structure that uses such a clip.

In order to achieve this object, the first aspect of the invention is a clip characterized in that the clip is provided with a pin and a main body that has an opening for the insertion of the pin; the pin has a pin flange and a pin shaft that extends down the pin flange, and the outer circumference of the pin flange curves downward; the main body has a bottom, a pair of latching claws that extend downward from the bottom running in line with the opening, an annular loop section on the upper side of the bottom and a gradual sloping element of low height from the outside of the loop to the bottom; and the inner diameter of the outer circumference of the pin flange of the pin is greater than the inner diameter of the sloping element of the main body and smaller than the outer diameter.

When the outer circumference of the pin flange curves downward, the rigidity of the pin flange increases, and there are fewer changes such as ruffling.

When the inner diameter of the edge of the outer circumference of the pin flange of the pin is greater than the inner diameter of the sloping element of the main body and smaller than the outer diameter, in the state of joining elements, the effect of watertightness increases because the edge of the outer circumference of the pin flange is in contact with the sloping element.

The pin flange has elasticity, and the angle made by the central axis of the pin and the perpendicular horizontal plane of the outer circumference of the pin flange is preferably greater than the angle that the sloping element makes with the horizontal plane.

When there is elasticity in the pin flange and the angle that the outer circumference of the pin flange forms with the horizontal is greater than the angle the sloping element forms with the horizontal, the effect of watertightness is enhanced, because the edge of the outer circumference is in contact with the sloping element of the main body.

If the difference between the angle of the outer circumference of the pin flange is smaller than the angle of the sloping element, it is difficult for the outer circumference of the pin flange to expand. For this reason, even if the load pushing on the pin is slight, there is sufficient contact pushing the outer circumference of the pin flange on the sloping element of the main body.

Preferably, the main body has support legs extending down from the bottom between the pair of latch claws running from the opening.

When the main body has support legs extending down from the bottom between the latching claws, they can be guided into the opening formed by the latch claws and the support legs corresponding to the direction of the pin.

Also, corresponding to the direction of the pin, the latch claws and support legs can be inserted into the attaching hole of the attached member.

The main body preferably has an annular main body thin-walled flange that is easy to curve around the opening on the lower side of the bottom, and a contact element around the main body thin-walled flange, and that in the joined situation with the main body thin-walled flange being curved, the edge of the main body thin-walled flange is preferably in contact with the surface of the attached member. The lower face of the contact element should be in contact with the surface of the attached member.

In the joined situation with the main body thin-walled flange curved, when the front of the main body thin-walled flange is in contact with the surface of the attached member, there is a hermetic seal between the main body and the attached member, and, thus, there is little concern of water penetrating.

The shaft of the pin preferably has a cylindrical shaft top element, a shaft plane element on the longitudinal plane provided at equal intervals circumferentially under the shaft top element, a pin release element with a curved surface of the neighboring pin shaft plane element and a small cylindrical pin latching convex element under the shaft plane element.

If the pin has a shaft plane element and a pin latching convex element, when the pin is inserted into the main body, the legs of the latching claws spread, the tips of the claws come in contact against the pin latching convex element, and the pin stops its passing through. The attached member can be fixed being held between the base element of the latching claw with legs spread and the contact element.

If the pin has a pin release element, letting the pin rotate and the tips of the latching claws contact the pin release element, the joining with the pin latching convex element can be disengaged.

Furthermore, the shaft preferably has pin rotation regulating ribs provided at equal intervals in a cylindrical direction under the pin releasing element; a pin taper element tapering downward provided between the neighboring pin rotation regulating ribs; a narrow cylindrical pin thin shaft under the pin rotation regulating ribs; and a cylindrical pin holding element under the pin thin shaft.

If there are pin rotation regulating ribs, the insertion direction of the pin vis-à-vis the main body can be regulated.

If there is a cylindrical pin thin shaft, the latching claws can be placed adjacent to the pin thin shaft and be kept in a temporary joined state in which the latching claws are not spread apart.

If there is a cylindrical pin holding element, the lower end of the latching claws are in contact with the pin holding element, and the pin can be stopped from passing through.

Preferably, in the temporary joined state, the latching claws of the main body are in contact with the pin rotation regulating ribs of the pin, and the pin is regulated so as not to rotate vis-à-vis the main body.

In the state in which the latching claws of the main body are in contact with the pin rotation regulating ribs of the pin, when the pin is pushed, the latching claws of the main body are in a position contacting the pin shaft plane element, and the primary joined state is easily facilitated.

Preferably, in the temporary joined state, the lower end of the latching claws of the main body is in contact with the pin holding element of the pin, and the passing through of the pin is retained; the pair of latching claws of the main body is adjacent to the pin taper element, and the pin is supported so that it is not pushed accidentally.

In the temporary joined state, the pin cannot become disconnected from the main body or be pushed accidentally, and the temporary joined state can be maintained in a stable manner.

Preferably, in the primary joined state, the latching claws are spread apart, and the latching tips of the latching claws are engage the pin latching convex element; the pin is stopped from passing through, and the attached member is held between the attaching base of the latching claws and the contact element.

If the passing through is stopped when the latching claws are spread apart, fixing is possible by the attached member being held between the attaching base of the latching claws and the contact element, and it is not easy to disconnect them.

If support legs are formed in the main joining, the support legs can have the function of guiding the pin in the direction of the opening.

If the edge of the outer circumference of the pin flange is in contact with the sloping element, the effect of watertightness is enhanced.

Preferably, the under side of the pin has several sloping pin release sides around the upper element of the pin shaft on the under side of the pin flange, the main body has several pin release ribs between the ring element and the opening, in the primary joined state, if the pin is caused to rotate, the pin release side is pushed up from the pin release ribs of the main body, the claw tips of the latching claws of the pin shift from the shaft plane element of the main body to the pin release element, the latching claws spread further, the joint with the pin latching convex element of the claw tips is released, the pin shaft can be released within the opening, and it returns to the temporary joined state.

If the under side of the pin has several sloping pin release sides around the pin shaft top below the pin flange and the main body has several pin release ribs between the ring element and the opening, the main body and the pin may easily return to the temporary joined state by rotating the pin.

If the main body and the pin return to the temporary joined state, they will be able to function again.

A second aspect of the invention is a pin characterized in that the pin used in a fastening structure providing a pin and a main body having an opening for inserting the pin; an elastic pin flange and a pin shaft extend downward from the pin flange, and the outer circumference of the pin flange curves downward; the pin shaft has a cylindrical shaft top; shaft plane elements in a longitudinal plane are provided at equal intervals in a cylindrical direction below the shaft top; there is a curved pin release element between the adjacent shaft plane elements; and short cylindrical pin latching convex elements are under the shaft plane elements.

A third aspect of the invention is the main body used in the fastening structure provided with a pin and a main body having an opening for inserting the pin; the main body is characterized in that it has a bottom, a pair of latching claws extending down from the bottom and through the opening, an annular loop section on the upper side of the bottom, a sloping element the height of which becomes gradually lower from the outside of the loop section to the bottom and support legs extending down from the bottom between a pair of latching claws passing through the opening.

A fourth aspect of the invention is the clip in which the pin and the main body having an opening for inserting the pin are in a temporary joined state; the pin has a pin flange and a pin shaft extending down form the pin flange, and the outer diameter of the pin flange curves downward; the main body has a bottom, a pair of latching claws extending downward from the bottom through the opening, an annular loop section on the upper side of the bottom and a sloping element the height of which becomes gradually lower from the outside of the loop section to the bottom; the pin shaft of the pin has pin rotation regulation ribs provided at equal intervals in a cylindrical direction; and the latching claws of the main body are in contact with pin rotation regulation ribs of the pin, so that the pin does not rotate vis-à-vis the main body.

The pin and the main body insert the clip, which is in a temporary joined state, into the attaching hole of the attached member and by easily joining them together, the clip can be fastened to the attached member.

A fifth aspect of the invention is a fastening structure characterized in that it fastens a clip provided with a pin and a main body having an opening for inserting the pin into the attaching hole of an attached member; the pin has a pin flange and a pin shaft extending downward from the pin flange, and the outer circumference of the pin flange curves downward; the main body has a bottom, a pair of latching claws extending downward from the bottom through the opening; an annular loop section on the upper side of the bottom and a sloping element, the height of which gradually decreases from the outside of the loop section to the bottom and two parallel rod-like contact elements on the lower side of the bottom; and the edge of the outer circumference of the pin flange is in contact with the sloping element of the main body.

When the latching claws of the main spread apart and the claw tip of the latching claws connect to the pin shaft of the pin, the pin is stopped from passing, and the attached member is held between the base opposite the latching claws and contact element of the main body.

In accordance with the present invention, a clip is proposed that can push a pin using little force and having satisfactory watertightness.

DESCRIPTION OF THE PREFERRED EMBODIMENTS

Figure 24:
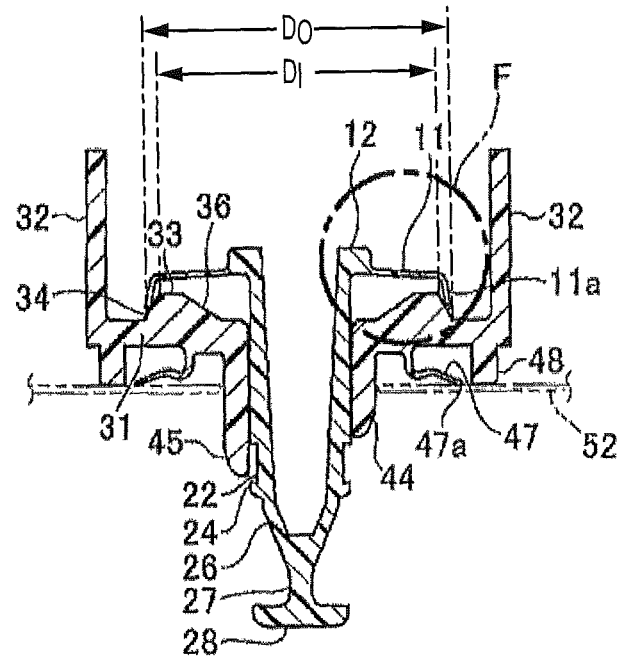
FIG. 24 is a cross sectional view along the same cross section XXIV-XXIV of FIG. 21 of the clip in the primary joined state.
Figure 25:
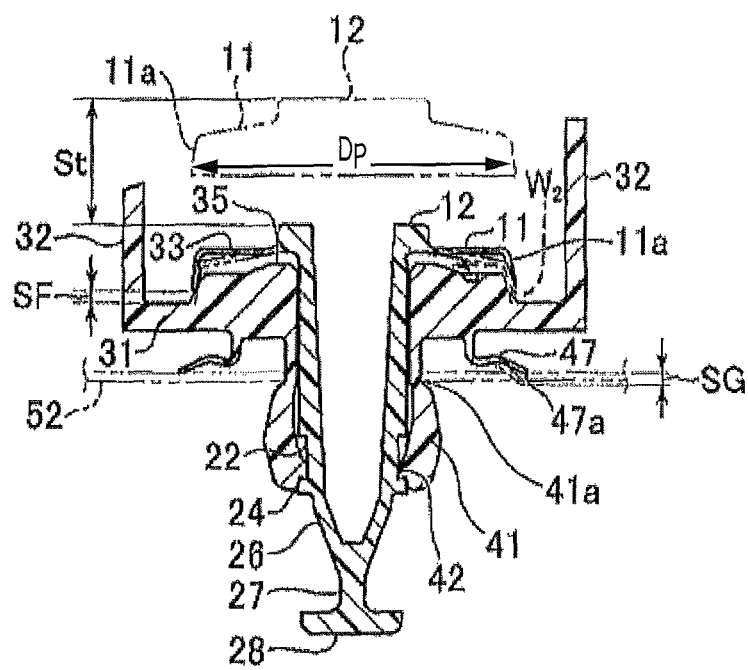
FIG. 25 is a cross-sectional view along the same cross section XXV-XXV of FIG. 19 of the clip of FIG. 24.
Figure 26:
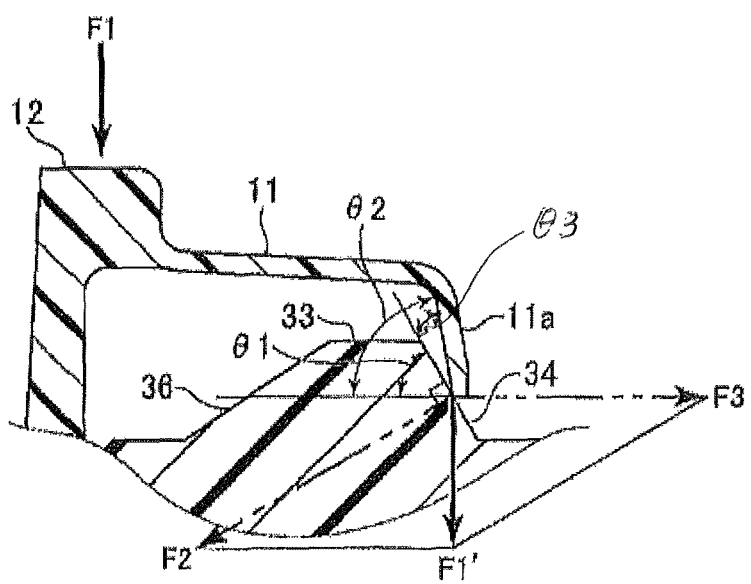
FIG. 26 is an enlarged view of the F part of the clip of FIG. 24.

An embodiment of the invention will be described in the following, with reference to the drawings. According to an embodiment of the invention, the clip consists of the main body made of plastic shown in FIGS. 2 to 8 and the pin made of plastic shown in FIGS. 9 to 15. When the pin 10 is pushed into the opening of the main body 30, the temporary joined state shown in FIGS. 16 to 22 is ensured. By inserting the clip 1 of the temporary joined state to the attaching hole 54 of the attached member 52 and pushing the pin 10 further into the main body 30, the primary joined state shown in FIGS. 24 to 26 is achieved, and the clip 1 is attached to the attached member 52.

In the description of this Specification, the central axis of the pin 10 is designated as the central axis and the direction of the central axis of the pin 10 as the vertical direction. The surface orthogonal to the central axis is designated as the horizontal surface.

The clip 1 is used to install attaching members such as a bumper retainer, protector, protective cover, bracket, etc. to an attached member 52 such as an automobile body panel. In the embodiment of the invention, the main body 30 of the clip 10 constitutes one element of a bumper retainer. Furthermore, the main body 30 constitutes a separate element with a bumper retainer; the main body may also be fixed to the bumper retainer.

Figure 1A:
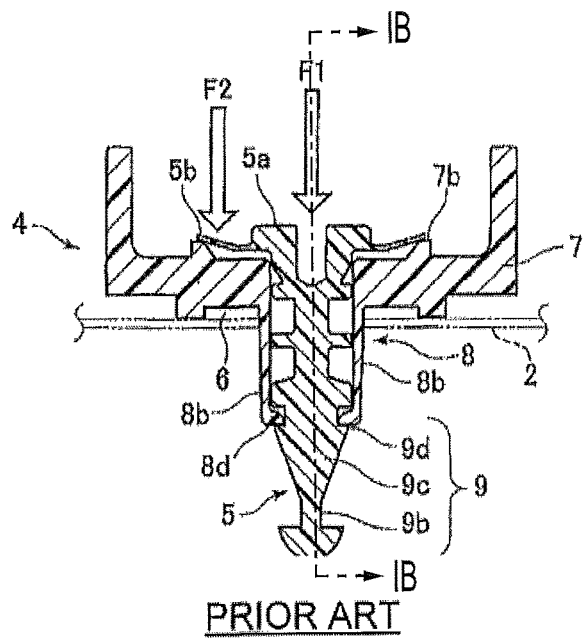
FIG. 1A is a cross-sectional view along the central axis of the fastening structure of the prior art JP2011-202692 A.
Figure 1B:
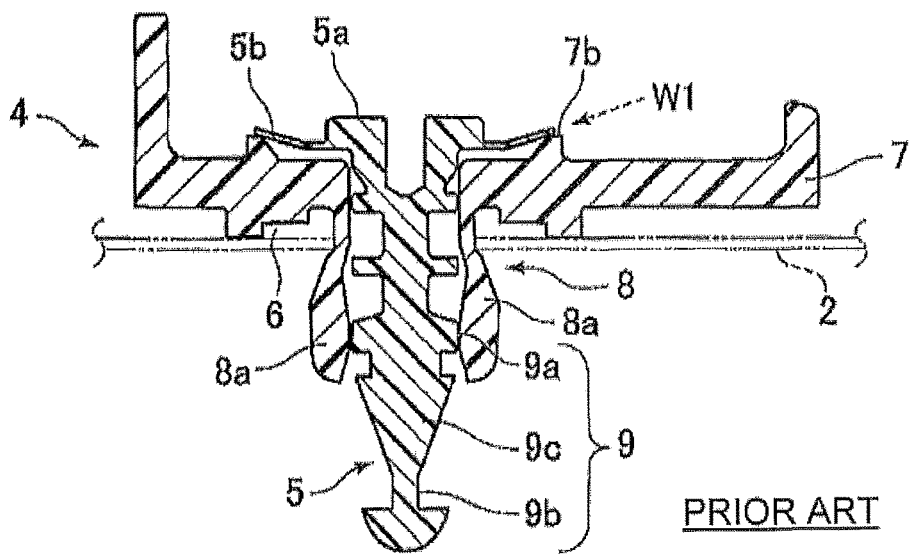
FIG. 1B is a cross-sectional view perpendicular to FIG. 1A of the fastening structure of the prior art.
Figure 2:
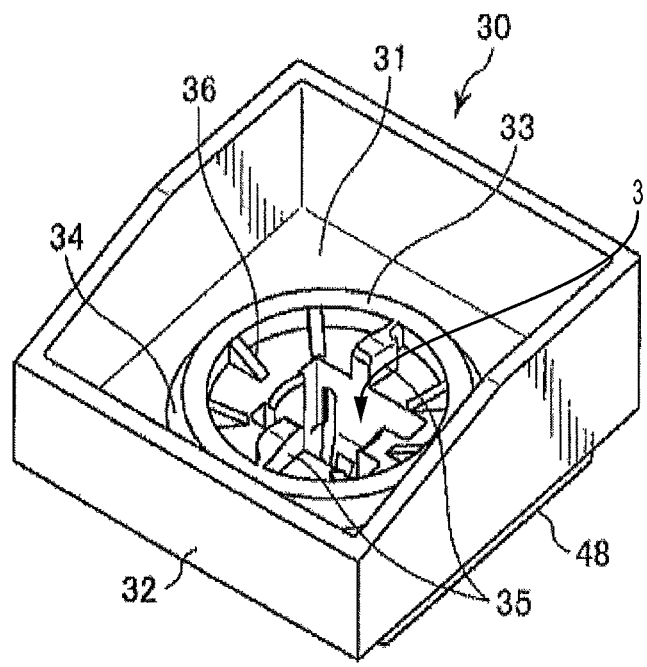
FIG. 2 is an oblique view from above of the main body of the clip according to the embodiment of the invention.
Figure 3:
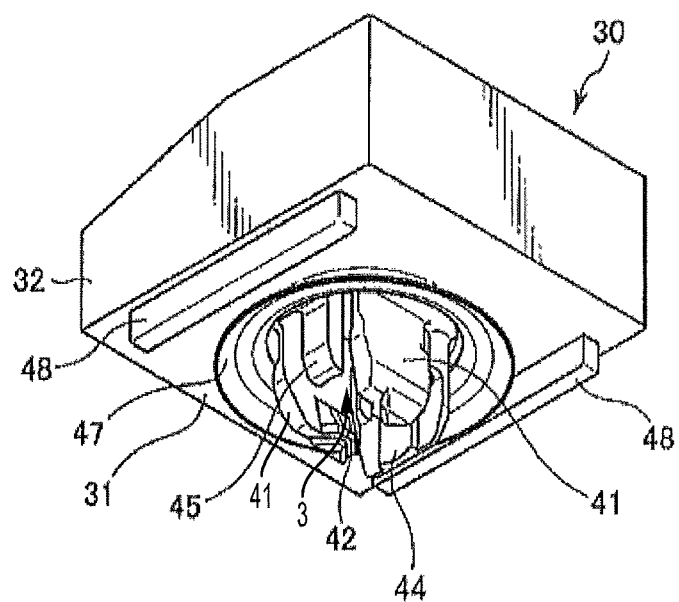
FIG. 3 is an oblique view from below of the main body of FIG. 2.
Figure 4:
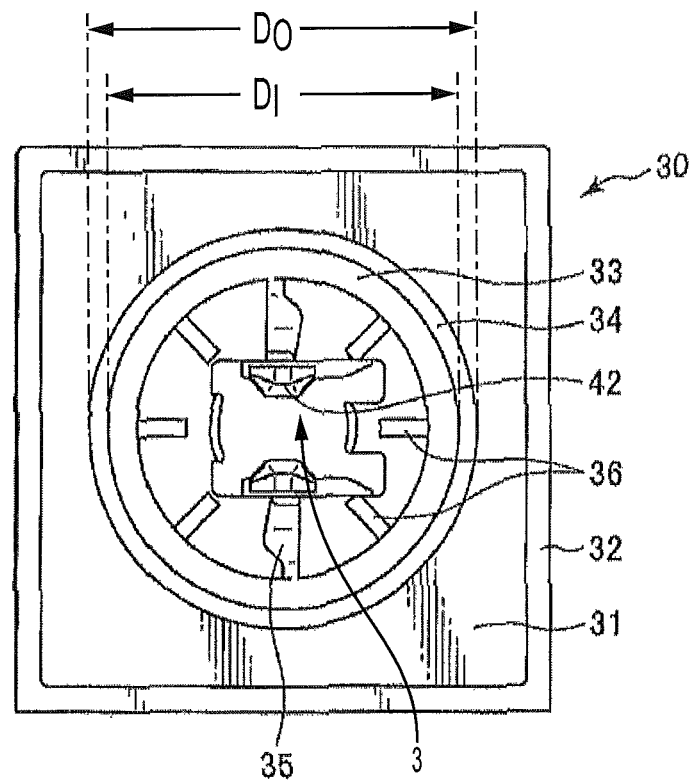
FIG. 4 is a top view of the main body of FIG. 2.
Figure 5:
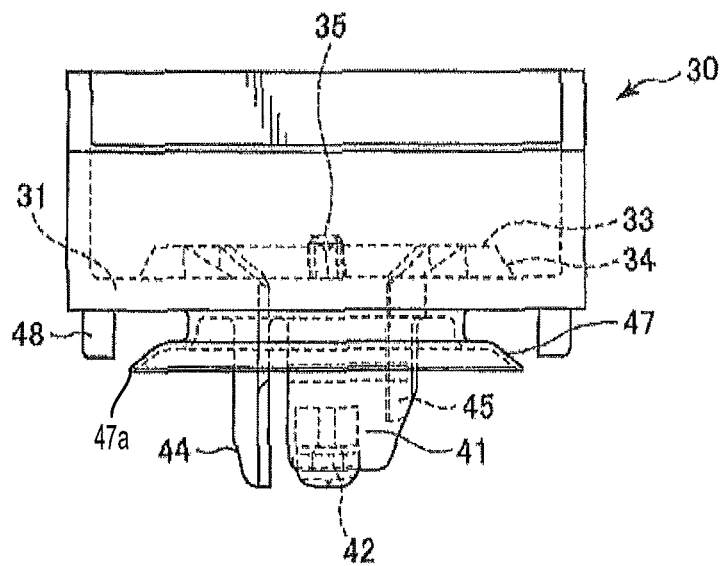
FIG. 5 is a front view of the main body of FIG. 2.
Figure 6:
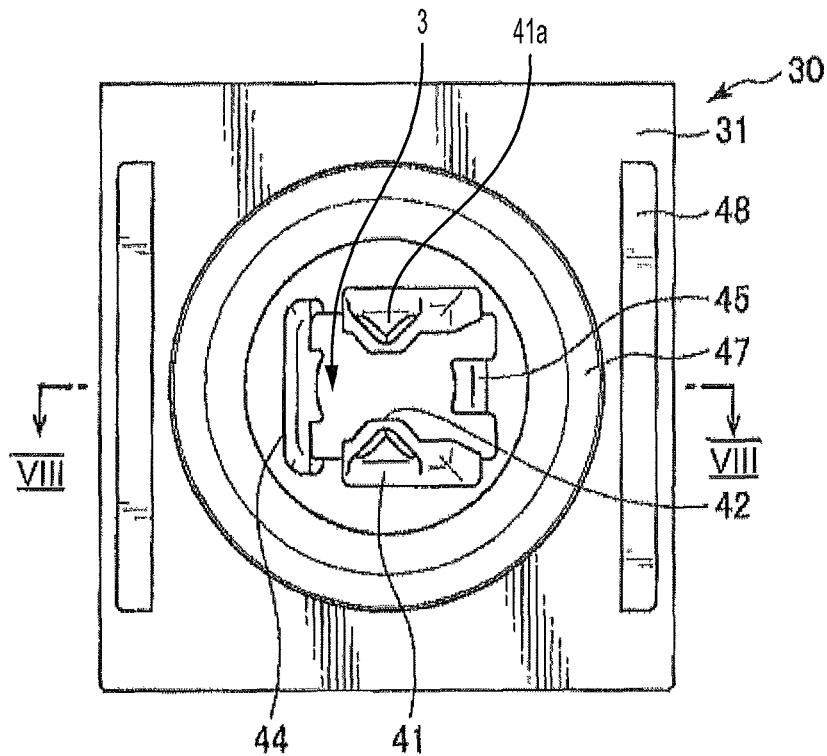
FIG. 6 is a bottom view of the main body of FIG. 2
Figure 7:
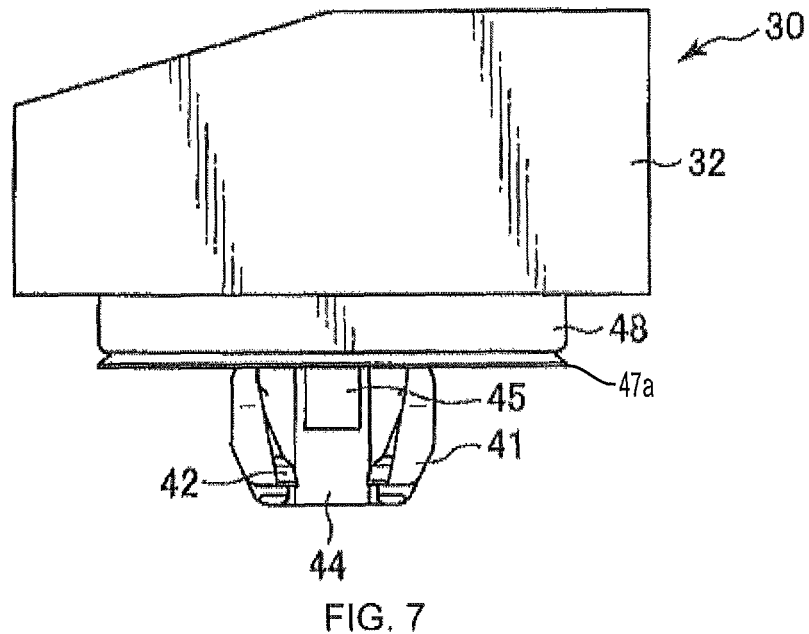
FIG. 7 is a right-side view of the main body of FIG. 2.
Figure 8:
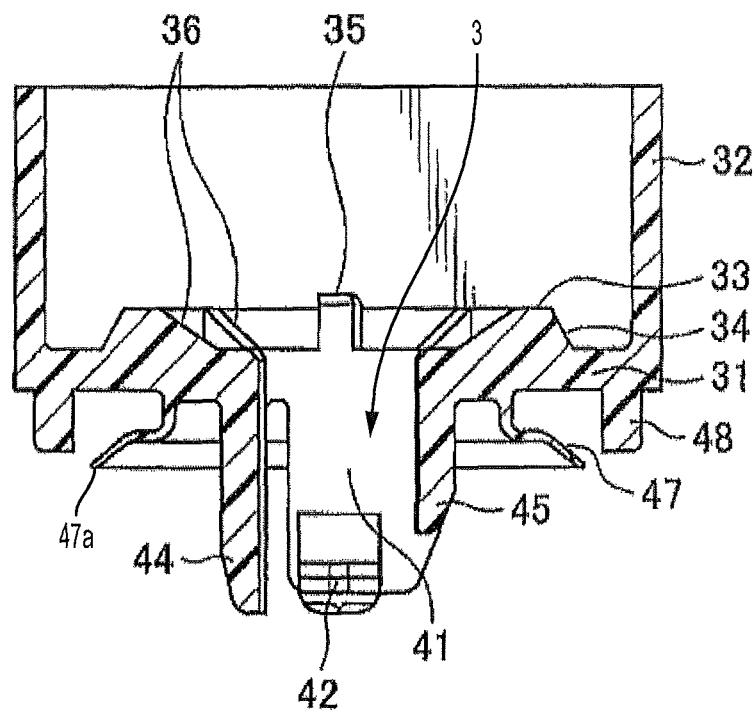
FIG. 8 is a cross-sectional view along line VIII-VIII of FIG. 6 of the main body of FIG. 2.

The main body 30 shall be described with reference to FIGS. 2 to 8. FIG. 2 is an oblique view showing the main body 30 of the clip 1 according to the embodiment of the invention from above, and FIG. 3 is an oblique view from below. FIG. 4 is a top view, FIG. 5 is a front view, FIG. 6 is a bottom view and FIG. 7 is a right-side view. FIG. 8 is a cross-sectional view along line VIII-VIII of FIG. 6.

As shown in FIGS. 2 and 3, the main body 30 on the exterior has a nearly square bottom 31 and side walls 32 extending upward from the each edge of the bottom 31. The upper surface of the bottom 31 is surrounded by four side walls 32.

In the embodiment of the invention, the main body 30 is one element of the bumper retainer, and the bumper retainer is extended to the sides of the side walls 32 (not shown in the drawing). The shape of the side walls 32 may be changed to correspond to the shape of the bumper retainer. There may not even be any side walls, depending on the shape of the bumper retainer.

The center of the bottom 31 is provided with an opening 3 to receive the pin 10 to be described below. An annular loop section 33 is provided around the opening 3 on the surface of the bottom 31. The loop section 33 has a fixed width and a fixed height. The outer circumference of the loop section 33 is a sloping element 34 that slants from the height of the loop section 33 to the bottom 31 in a radial direction. The inner diameter $D_P$ of the edge of the outer circumference 11a of the pin flange 11 of the pin 10 is greater than the inner diameter $D_I$ of the sloping element 34 and smaller than the outer diameter $D_O$. The pin flange 11 covers the sloping element 34 so that the edge of the outer circumference 11a of the pin flange 11 is in contact with the sloping element 34.

As shown in FIGS. 2 and 4, between the inside of the loop section 33 and the opening 3, a pair of facing pin release ribs 35 is provided. The pin release ribs 35 face the central axis from the loop section 33; their height is greater than that of the loop section 33. As to be described below, the pin release ribs 35 are used to detach the pin 10.

Where there are no pin release ribs 35 between the inside of the loop section 33 and the opening 3, loop section reinforcement ribs 36 are provided. The loop section reinforcement ribs 36 face the opening 3 from the loop section 33; their height is reduced. Three loop section reinforcement ribs 36 are provided on one side of the circumference between the pair of pin release ribs 35 and three on the other side at equal intervals. The loop section reinforcement ribs 36 are provided along the loop section 33 and reinforce the loop section 33. The shape and number of loop section reinforcement ribs 36 may be different from those shown in the embodiment.

As shown in FIG. 3, on the under side of the bottom 31, a pair of latching claws 41 extend downward through the opening 3. As shown in FIG. 7, the latching claws 41 become thicker as they descend. The latching claws 41 are pushed by the pin shaft 20 of the pin 10 and can be spread apart. The spreading occurs by opening the tips 42 of the pair of latching claws 41 so that they separate from each other. In the primary joined state, the attaching base 41a (FIG. 25) of the latching claws 41 engages the edges of attaching hole 54 of the attached member 52. Since the latching claws 41 are spread apart, the attached member 52 can be held.

From near the lower end of each latching claw 41, the claw tips 42 project inward towards the central axis. In the primary joined state, the claw tips 42 engage the pin latching convex element 24 of the pin 10 (FIG. 25).

As shown in FIG. 8, which is a cross-sectional drawing along line VIII-VIII of FIG. 6, at right angles to the pair of latching claws 41, a pair of support arms 44, 45 extend downwards. The support leg 44 on one side is wide and has nearly the same length as the latching claw 41. As shown in FIG. 6, the exterior away from the central axis of the support leg 44 is nearly level and its interior center near the central axis has an arc shape in its cross section in order to conform to the pin shaft 20 of the pin 10.

The other support leg 45 is not as wide as the support leg 44; it is also shorter in length. The exterior away from the central axis of the support leg 45 is nearly level, and its interior near the central axis has a convex shape in order to conform to the pin shaft 20 of the pin 10.

In the embodiment of the invention, the shapes of one of the support legs 44 and of the other support leg 45 are different. The shapes of the support legs are not limited to those shown in the embodiment. The shapes of the support legs 44, 45 may be realized to insert the support legs 44, 45 into the attaching holes 54 of the attached member 52 and to guide the pin shaft 20 into the inside opening of the support legs 44, 45.

The cross-sectional exterior connecting the pair of latching claws 41 and the support legs 44, 45 is nearly rectangular and conforms to the attaching holes 54 of the attached member 52. The pair of latching claws 41 and support legs 44, 45 should be able to be inserted into the attaching hole 54 of the attached member 52.

Also, the opening 3 of the main body 30 is an empty space surrounded by the pair of latching claws 41 and the support legs 44, 45. The shaft of the pin 20 of the pin 10 is to be guided into the opening 3 of the main body 30.

The space between the support legs 44, 45 is greater than or equal to the upper element of the pin shaft 20 of the pin 10. The support legs 44, 45 do not function to latch the pin 10 into the opening 3 of the main body 30, as they do not spread apart in the temporary joined state or the primary joined state. The support legs 44, 45 do not function to fix the main body into the attached member 52.

As shown in FIGS. 5 and 6, there is a main body thin-walled flange 47 on the underside of the bottom 31 around the opening 3; it extends down to widen towards the outside. Since the main body thin-walled flange 47 is a thin wall and—looking at the cross section—it ripples, it bends easily. In the fixed state of the clip 1 to the attached member 52, the main body thin-walled flange 47 curves to contact the surface of the attached member 52 and makes a seal between the main body and the attached member 52; thus maintaining watertightness.

On the under side of the bottom 31, a pair of opposing contact elements 48 extend in a straight line horizontally along the edge of the bottom. The height of the contact elements 48 is uniform. The contact elements 48, when in the state of being fixed to the attached member 52, hold the clip 1 at a uniform distance between the bottom of the attached member 52 and the attached member 52. The edge 47a of the main body thin-walled flange 47 is pushed to the same height as that of contact elements 48, contacting the surface of the attached member 52 and making a seal. The contact elements 48 prevent the crushing of main body thin-walled flange, thus maintaining watertightness.

Figure 9:
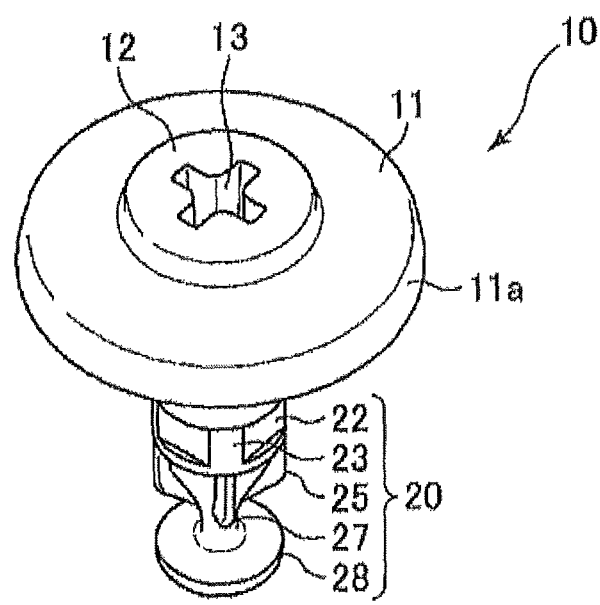
FIG. 9 is an oblique view from above of the pin of the clip according to the embodiment of the invention.
Figure 11:
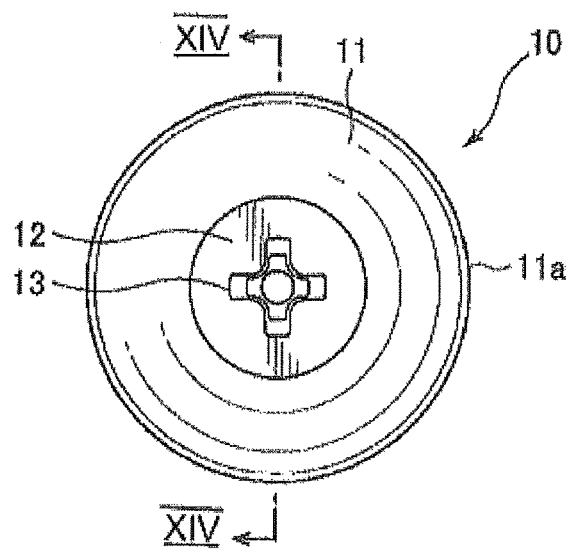
FIG. 11 is a top view of the pin of FIG. 9.
Figure 12:
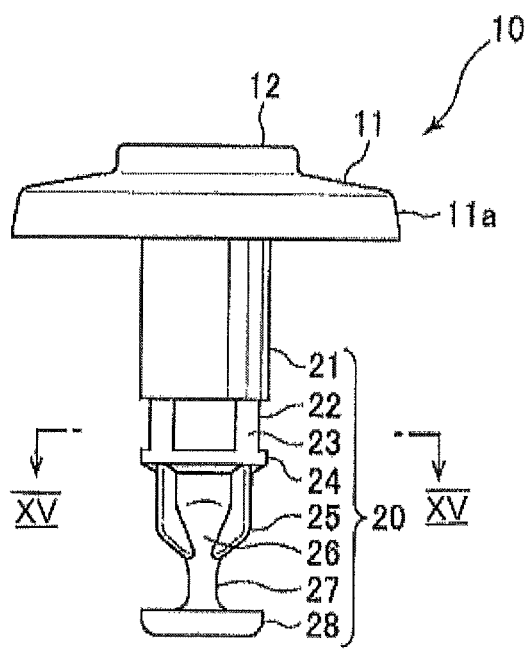
FIG. 12 is a front view of the pin of FIG. 9.
Figure 13:
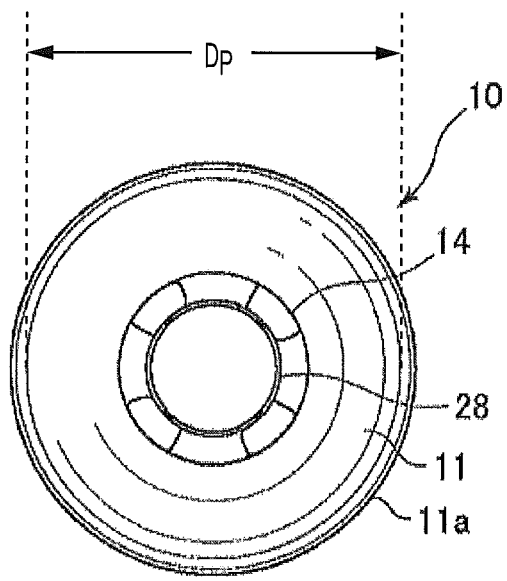
FIG. 13 is a bottom view of the pin of FIG. 9.
Figure 14:
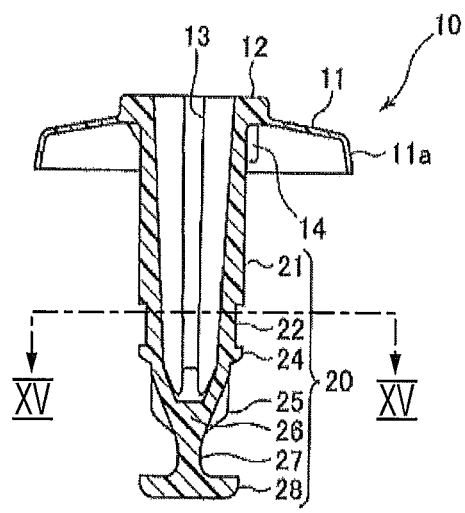
FIG. 14 is a cross-sectional view along line XIV-XIV of FIG. 11 of the pin of FIG. 9.
Figure 15:
FIG. 15 is a cross-sectional view along line XV-XV of the FIG. 12 of the pin of FIG. 9.

The pin 10 will be described with reference to FIGS. 9 to 15. FIG. 9 is an oblique view of the pin 10 of the clip 1 from above, and FIG. 10 an oblique view from below, according to the embodiment of the invention. FIG. 11 is a top view, FIG. 12 is a front view, FIG. 13 is a bottom view, FIG. 14 is a cross-sectional view along line XIV-XIV of FIG. 11; FIG. 15 is a cross-sectional view along line XV-XV of FIG. 12.

The pin 10 has a cylindrical pin flange 11 on its upper element and a pin shaft 20 extending down from the pin flange 11. The pin flange 11 has an outer circumference 11a in a shape that curves downward and is highly rigid. Also, the outer circumference 11a can cover and overlap the sloping element 34 of the main body 30; therefore, a high level of watertightness can be achieved.

As shown in FIG. 9, the center of the pin flange 11 is a central convex element 12, and its cylindrical surface is a step higher than the pin flange 11. A cross-shaped slot 13 is formed on the central convex element 12. By inserting the tip of a screwdriver into the cross-shaped slot 13 and rotating the pin 10, the pin 10 may be removed from the main body 30.

Figure 10:
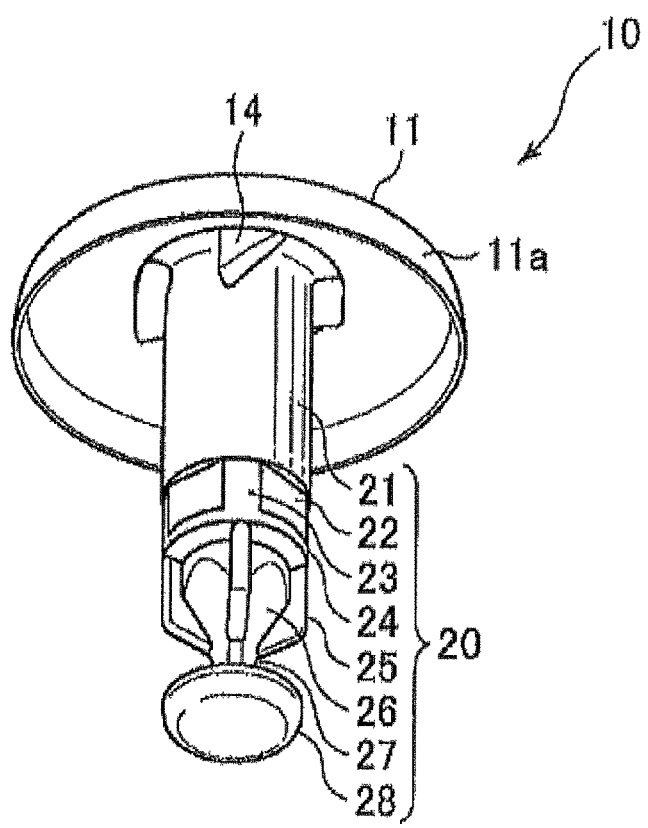
FIG. 10 is an oblique view from below of the pin of FIG. 9.

As shown in FIG. 10, four pin release leaves 14 are disposed at an equal distance around the pin shaft 10 under the pin flange 11. The pin release leaves 14 have a uniform radial thickness, the outer surface 14a is in the shape of a right triangle, and the under side 14b is a sloping surface. This sloping surface has a height that gradually decreases in a clockwise direction. When the pin 10 is rotated to be removed, the sloping surface of a pin release leaf 14 slides into contact on the pin release rib 35 of the main body, and the pin 10 is pushed up.

As shown in FIGS. 10 and 12, the pin shaft 20 extends along the central axis under the central convex element 12. The pin shaft 20 includes a pin shaft top 21, a pin shaft plane 22, a pin release element 23, a pin latching convex element 24, a pin rotation regulating element 25, a pin taper 26, a pin thin shaft 27 and a pin holding element 28.

As shown in FIG. 14, the cross-shaped slot 13 is disposed deeply into the pin taper 26 of the pin shaft 20.

The outer surface of the pin shaft top 21 situated at the highest element of the pin shaft 20 is cylindrical. Below the pin shaft top 21, four rectangular pin shaft planes 22 are disposed at equal intervals around the upper element. A circular surfaced pin release element 23 is between two adjacent pin shaft planes 22. As shown in FIG. 15, a cross-sectional view along line XV-XV of FIG. 12, the pin shaft planes 22 and the pin release elements 23 are disposed, alternating with each other.

Under the pin shaft planes 22, there is a cylindrical pin latching convex element 24 having a short outer surface. The outer diameter of the pin release element 23 is nearly the same in diameter as the pin shaft top 21 and the pin latching convex element 24.

In the primary joined state, the latching tips 42 of the latching claw 41 of the main body are in contact with the pin latching convex elements 24, and the pin 10 is held so as not to be removed. When removing the pin 10, the pin 10 is rotated, and latching tips 42 strike into the pin release elements 23 from the pin shaft planes 22. Because the surfaces of the pin release elements 23 and the pin latching convex elements 24 are connected, the latching claws 42 release their contact with the pin latching convex elements 24, and the pin 10 can be removed from the opening 3 into the temporary joined state.

Under the pin latching convex elements 24, four pin rotation regulating ribs 25 in the form of thin plates extend vertically at equal distances in a radial direction. The angle position around the central axis of the pin rotation regulating ribs 25 is the same as the angle position of the pin release elements 23. The elements between the adjacent pin latching convex elements 24 are the pin tapers 26 with their tapering gradually narrowing downward.

In the temporary joined state of the main body 30 and the pin 10, the pin rotation regulating ribs 25 regulate the relative position of the pin 10 vis-à-vis the main body 30 by having each of the latching claws 41 and support legs 44, 45 go in between the adjacent pin rotation regulating ribs 25.

In the temporary joined state, when the pin 10 is pushed into the opening 3 of the main body 30, the claw tips 42 of the pair of latching claws 41 move along the pin taper 26 and gradually spread apart. When the pair of claw tips 42 goes up from the pin latching convex elements 24, they join the pin latching convex elements, and the pin 10 is retained.

Under the pin rotation regulation ribs 25 and the pin taper 26 is a thin cylindrical narrow pin shaft element 27. The tip of the pin shaft 20 under the narrow pin shaft element 27 is a circular disk pin holding element 28 of greater diameter than the narrow pin shaft element 27. The diameter of the pin holding element 28 is nearly equal to the diameters of the pin shaft top 21, the pin releasing elements 23 and the pin latching convex elements 24.

In the temporary joined state, the claw tips 42 of the latching claws 41 of the main body 30 come in contact with the top of the pin holding element 28 and hold the pin 10 so that it does not become removed from the main body 30. Also, the latching claws 41 are positioned around the pin taper 26. If the pin 10 is pushed with strong force, the pin taper 26 spreads out the latching claws 41, and the shaft 20 of the pin 10 enters into the opening 3 of the main body 30.

Figure 16:
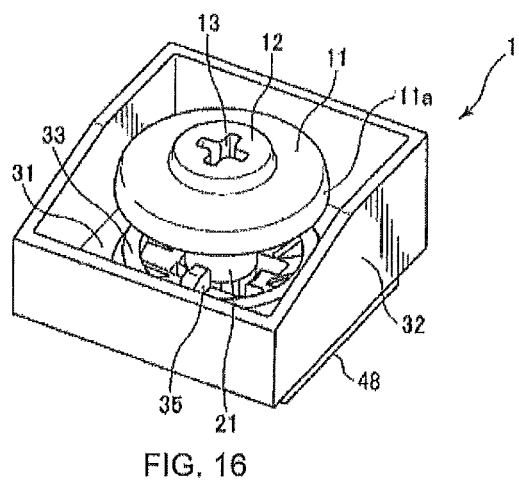
FIG. 16 is an oblique view from above of the clip in the temporary joined state of the main body of FIG. 2 and the pin of FIG. 9.
Figure 17:
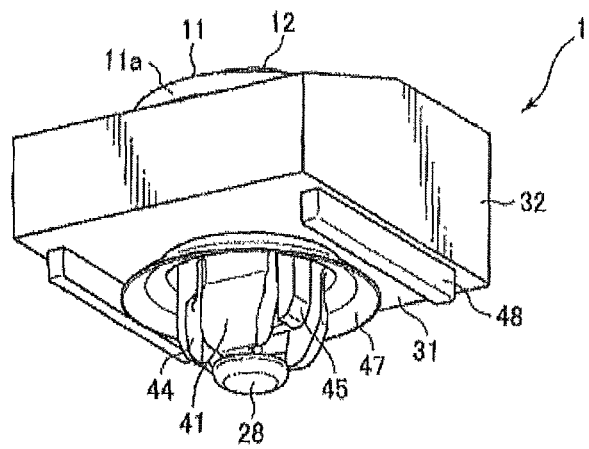
FIG. 17 is an oblique view from below of the clip of FIG. 16.
Figure 18:
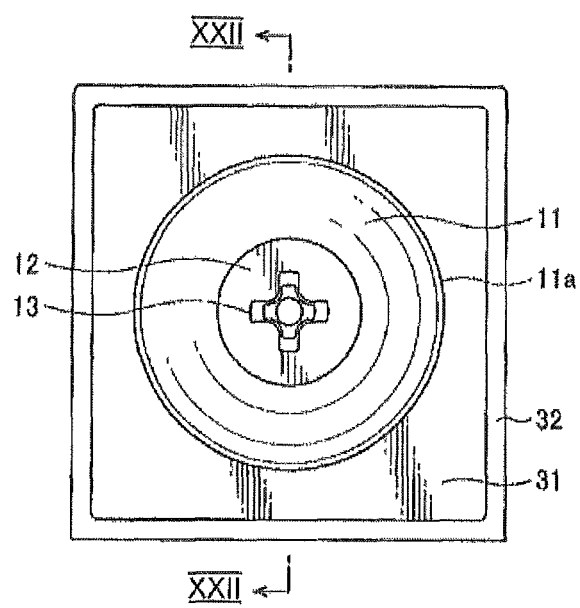
FIG. 18 is a top view of the clip of FIG. 16.
Figure 19:
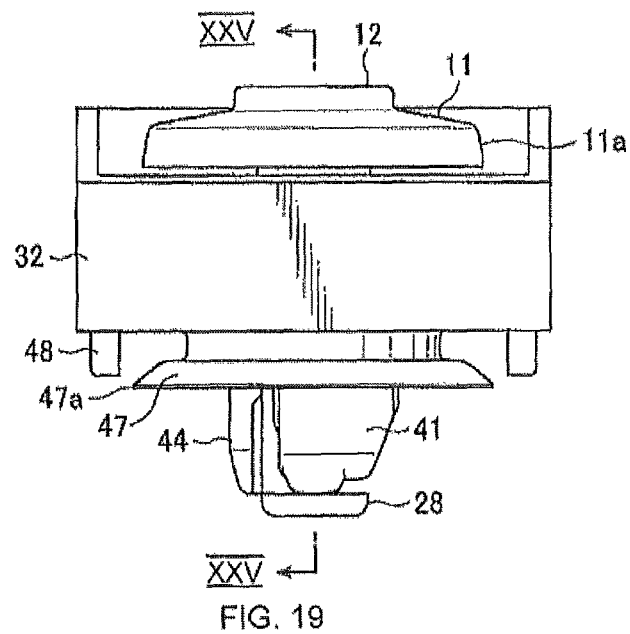
FIG. 19 is a front view of the clip of FIG. 16.
Figure 20:
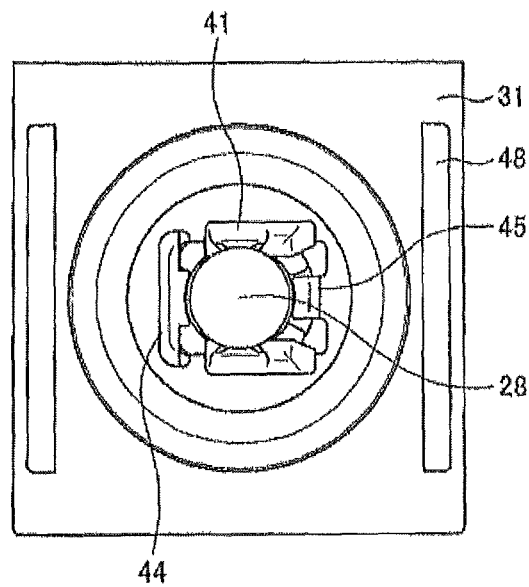
FIG. 20 is a bottom view of the clip of FIG. 16.
Figure 21:
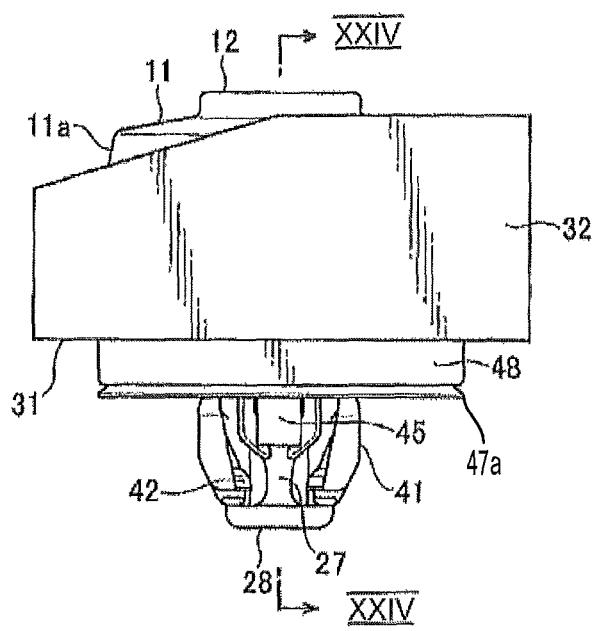
FIG. 21 is a right side view of the clip of FIG. 16.
Figure 22:
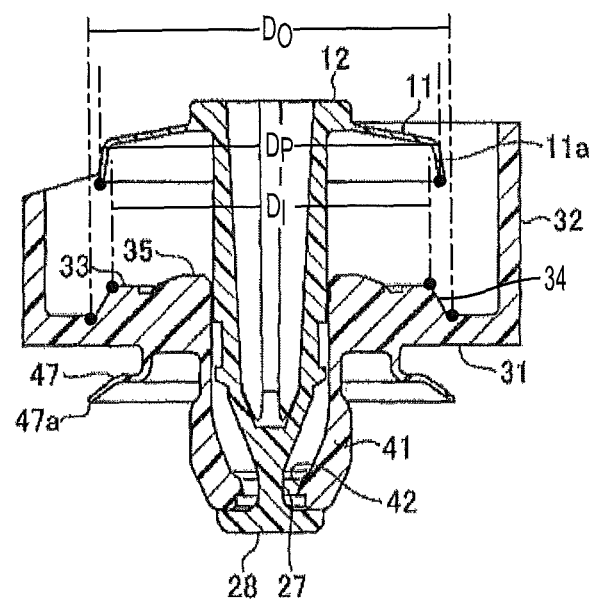
FIG. 22 is a cross-sectional view along line XXII-XXII of FIG. 18 of the clip of FIG. 16.

Generally, the clip 1 keeps the setup of the main body 30 and the pin 10 in the temporary joined state and is supplied in this type of setup. FIG. 16 is an oblique view from above of the clip 1 in the temporary joined state of the main body 30 and the pin 10; FIG. 17 is an oblique view from below. FIG. 18 is a top view, FIG. 19 is a front view, FIG. 20 is a bottom view and FIG. 21 is a right side view. FIG. 22 is a cross-sectional view along line XXII-XXII of FIG. 18.

When the pin 10 and the main body 30 are temporarily joined, the pin 10 and the main body 30 are connected such that the latching claws 41 and support legs 44, 45 of the main body 30 go between the adjacent pin rotation regulating ribs 25 of the pin 10. The pin holding element 28 of the pin 10 heads into the central opening 3 from the side walls 32 of the main body 30, and the pin is inserted. At this time, the pin holding element 28 pushes apart the latching claws 41 of the main body 30.

The space between the support legs 44, 45 is equal to or slightly larger than the diameter of the pin holding element 28, and, when the pin 10 is pushed into the main body 30, the support legs 44, 45 do not spread apart.

When the pair of latching claws 41 spreads apart and the claw tips 42 ride over the pin holding element 28, the latching claws 41 close, and the claw tips 42 are positioned on both sides of the narrow pin shaft 28. The lower ends of the latching claws 41 contact the pin holding element 28. This position is the temporary joined state. As shown in FIG. 21, the lower ends of the latching claws 41 are in contact with the pin holding element 28, and the pin 10 is retained. As shown in FIG. 22, the inside of the latching claws 41 are positioned while opening a gap with the tapering of the pin taper 26.

A space is opened between the pin flange 11 of the pin 10 and the loop section 33 of the main body 30.

In the temporary joined state, if one should push the pin 10 further, great force is necessary to push it, since the latching claws are wider than the pin taper 26. For this reason, incorrectly pushing into the primary joined state can be prevented.

In the temporary joined state, the latching claws 41 of the main body 30 contact the pin rotation regulating ribs 25 of the pin 10, and the pin 10 and the main body 30 are regulated so that they do not rotate in relation to each other.

Figure 23:
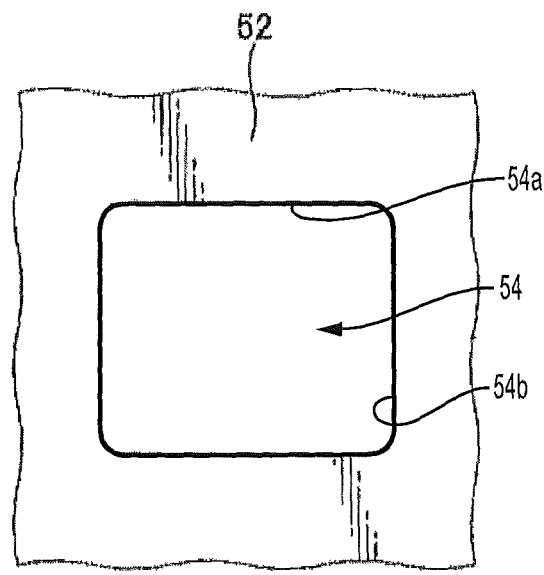
FIG. 23 is a top view of the attaching hole of the attaching member.

FIG. 23 is a top view of part of the attaching hole 54 of the attached member 52. The shape of the attaching hole is a rectangle. The long side 54a of the attaching hole 54 is in contact with the latching claws 41 and the short side 54b with the support arms 44, 45.

FIG. 24 is a cross-sectional view along the same cross-section as line XXIV-XXIV of FIG. 21 (temporary joined state) of the clip 21 in the primary joined state of the main body 30 and the pin 10.

FIG. 25 is a cross-sectional view along the same cross-section as line XXV-XXV of FIG. 19 (temporary joined state) of the clip 1. FIG. 26 is an enlargement of the F element of FIG. 24 of the clip 1.

To move to the primary joined state from the temporary joined state of the clip 1, the latching claws 41 and support arms 44, 45 of the main body of the clip 1 in the temporary joined state are inserted into the attaching hole 54 of the attached member 52 of a body panel or the like, so that they enter the attaching hole 54 of the attached member 52. The latching claws 41 run along the long side 54a of the attaching hole 54, and the support legs 44, 45 along the short side 54b. The contact member 48 on the under side of the bottom 31 of the main body 30 are in contact with the surface around the attaching hole 54 of the attached member 52. At this time, the edge 47a of the main body thin-walled flange 47 curves contacting the attached member 52. The attached member 52 is designated by a chain double-dashed line.

Next, the pin 10 is pushed down into the opening 3 of the main body 30. The pin taper 26 of the pin 10 spreads out the latching claw 41 of the main body 30, and the pin 10 moves down. As shown in FIG. 25, the pair of latching claws 41 spread apart, and the claw tips 42 of the latching claws 41 clear the pin latching step element 24; joining with the pin latching step element 24, the pin 10 is retained. The claw tips 42 are spread out by the pin shaft plane 22, widening the distance.

The distance between the opposing pair of support legs 44, 45 is greater than or equal to the diameter of the pin shaft 20. As shown in FIG. 24, when the pin 10 is pushed into the opening 3 of the main body 30, the support legs 44, 45 do not spread open. The support legs 44, 45 are in contact with the pin shaft top 21.

The position of the pin flange 11 of the pin 10 and the central convex member 12 in the temporary joined state is shown by the chain double-dashed line in FIG. 25. When the primary joined state comes out of the temporary joined state, the pin 10 moves only by the distance St. As shown in FIG. 25, the attached member 52 is fixed between the contact member 48 under the bottom 32 of the main body 30 and the spread-out latching claws 41, and the primary joined state occurs. In the primary joined state, the outer circumference 11a of the pin flange 11 is in contact with the sloping element 34 so as to cover it.

The configuration of the pin flange 11 in the temporary joined state is shown by a dotted line.

In the primary joined state, the edge of the outer circumference 11a of the flange 11 is in contact with the sloping element 34 of the main body 30. The outer circumference 11a of the flange 11 is pushed by the sloping element 34 of the main body 30 and curves downward. The outer circumference 11a of the flange 11 and the sloping element 34 are in contact; a high degree of watertightness can be obtained.

The distance in the height direction of the edge of the outer circumference 11a and the top side of the bottom 31 is SF.

The configuration of main body thin-walled flange 47 in the temporary joined state is shown by a dotted line. In the primary joined state, the main body thin-walled flange 47 of the main body 30 comes in contact with the surface of the attached member 52 and bends; from the under side of the bottom 31, the length of the height direction to the edge 47a of the main body thin-walled flange 47 is equal to the length of the height direction of the contact element 48. The bending amount of the edge 47a of the main body thin-walled flange 47 is the distance SG. The main body thin-walled flange 47 makes a seal between the main body 30 and the attached member 52, improving watertightness.

FIG. 26 is an enlargement of the F region from FIG. 24 of the clip 1. Referring to FIGS. 24 and 26, the interior angle θ2 of the outer circumference 11a of the pin flange 11 to an imaginary plane perpendicular to the the central axis of the pin 12 is greater than the interior angle θ1 of the sloping element 34 to the imaginary plane and θ2-θ1 is a smaller acute angle θ3. The inner diameter $D_P$ of the edge of the outer circumference 11a of the pin flange is smaller than the outer diameter $D_O$ of the sloping element 34 and greater than the inner diameter $D_I$ of the sloping element 34. Since the direction of the sloping element 34 and the direction of the outer circumference 11a of the pin flange 11 is close on a parallel, the edge of the outer circumference 11a of the pin flange 11 comes in contact with the sloping element 34 at a small angle θ3, improving watertightness.

The water penetration path of the clip 1 is shown by W2 in FIG. 25. Since the clip 1 is constructed so that the outer circumference 11a of the pin flange 11 covers over the sloping element 34, the water penetration path W2 is kinked up in an intricate manner, improving watertightness.

If the pin 10 is pushed down with force F1, the edge of the outer circumference 11a of the pin flange 11 pushes the sloping element 34 down with the force F1' of the same magnitude as F1. F1' may be composed of force F2 (a normal force on the sloping element 34) and the horizontal force F3. It is difficult for the outer circumference 11a of the pin flange 11 to expand outwards by curving down in the approximate shape of a cylinder. For this reason, the pushing force of the pin flange 11 on the sloping element 34 is great enough so that a seal can actually be made between the pin flange 11 and the sloping element 34.

Once the pin 10 and the main body 30 of the clip 1 are put in the primary joined state and fixed to the attached member 52, we shall now describe the method for removing the pin 10 and the main body 30. The pin 10 can be removed from the main body 30 by using a Phillips screwdriver, an everyday tool.

When the pin 1 is rotated by inserting the tip of a Phillips screwdriver into the cross-shaped slot 13 of the pin 1 of the clip 10 in the primary joined state, the pin release leaves 14 of the pin 10 slide in contact over the pin release ribs 35 of the main body 30. Since the under side of the pin release leaves 14 is a sloping surface, when rotating the pin 10 counterclockwise, the pin 10 is pushed up. When the pin 10 is rotated counterclockwise, the claw tips 42 move toward the pin shaft release elements 23 from the pin shaft plane 22, and the latching claws 41 spread further apart. The latching tips 42 release the connection with the pin latching convex element 24. The support legs 44, 45 do not engage the shaft 20 of the pin 10. Subsequently, the pin 10 can be removed from the opening 3 of the main body 30.

When the pin 10 moves upward, the latching tips 42 move relatively under the pin latching convex element 24 and downward along the pin taper 26.

The latching claws 41 are situated on the side of the pin taper 26 between the pin rotation regulation ribs 25 of the pin 10. The claw tips 42 are situated on the side of the pin thin shaft; when the lower end of the latching claws 41 come in contact with the pin holding element 28, the upward movement of the pin 10 stops. Thus, it returns to the temporary joined state shown in FIG. 16 and can be used again.

Furthermore, if the latching claws 41 are spread apart and the claws tips 42 are moved down toward the pin holding element 28, the pin 10 can be completely removed from the main body 30.

In the embodiment of the invention, the bumper retainer is constructed in one piece with the main body 30; however, after constructing the bumper retainer as a separate element from the main body 30, the main body 30 may be fixed to the bumper retainer.

According to the embodiment of the invention, the construction is such that the pin flange covers the inclined element; the direction in which the pin is pushed and the direction of the inclined element of the main body in which the pin flange is pressed are close in parallel. Because of this, sufficient watertightness can be achieved by pushing lightly.

Further, because the outer circumference of the pin flange has a shape that curves it is hard for it to expand outward. Also, compared with a flat-shaped pin flange, there is little deformation such as rippling etc. and no dispersion of the watertightness function.

According to the embodiment of the invention, attaching elements such as bumper retainers, protectors, brackets, etc. can be attached to an attached member of automobile body panel or the like carrying a light load. In addition, a clip having satisfactory watertightness can be obtained. Further, a fastening structure that uses such a clip can be obtained.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A clip assembly for installation in a through hole of a workpiece attached member from a top side of the attached member, the hole defining a perpendicular axis, and the clip comprising:

a pin including a pin shaft, and a pin flange extending radially from proximate a top end of the pin shaft and extending axially downward at an outer circumference of the pin flange;

a main body including a bottom with an upper side and lower side and defining an opening for partial insertion of the pin, an annular loop projecting axially above the upper side of the bottom and surrounding the opening, and a sloping surface running radially outward and axially downward from a top of the annular loop to the bottom; and the outer circumference of the pin flange defining a pin diameter, the sloping surface defining an inner diameter proximate the top of the annular loop and an outer diameter proximate to the bottom, and the pin diameter is greater than the inner diameter and less than the outer diameter.

2. A clip assembly according to claim 1 wherein the axis defines a horizontal plane perpendicular to the axis, and the sloping surface defines a first acute angle with the plane, and the outer circumference of the pin flange defines a second acute angle with the plane, and the second acute angle is greater than the first acute angle.

3. A clip assembly according to claim 1 wherein the base further includes a thin walled annular base flange surrounding the opening and projecting radially outward and axially downward a first axial distance and from the lower side of the bottom, and a contact element projecting axially downward a second axial distance from the lower side of the bottom, and the first axial distance is greater than the second axial distance; and wherein a joined state of the clip assembly with the attached member, the contact element holds the bottom at the second distance from the top side of the attached member, and the base flange is compressed and splayed out between the bottom and the top side of the attached member.

4. A clip assembly according to claim 1, wherein the pin further includes:

a cylindrical shaft top axially proximate to the pin flange;

a shaft plane element located axially beneath the shaft top and circumferentially adjacent to a pin release element of a curved surface; and a cylindrical pin latching convex element located axially below the shaft plane element.

5. A clip assembly according to claim 4, wherein the pin further includes:

a plurality of pin rotation regulating ribs located beneath the pin release element and arranged at equal circumferential intervals;

a pin taper element inward located between neighboring pin rotation regulating ribs and tapering axially downward and radially inward;

a narrow cylindrical pin thin shaft below the pin rotation regulating ribs; and a cylindrical pin holding element below the pin thin shaft.

6. A clip assembly according to claim 5, wherein the base further includes:

a latching claw extending axially downward from and perpendicular to the lower side of the bottom, and a support arm extending axially downward from and perpendicular to the lower side of the bottom.

7. A clip assembly according to claim 6, wherein the latching claw is engageable with the pin rotation regulating rib so as prevent free rotation of the pin relative to the main body.

8. A clip assembly according to claim 6, wherein a temporary joined state of the pin and the main body, a tip of the latching claw is engaged to the pin between the pin taper element and the pin holding element to resist unintentional axial movement of the pin within the main body.

9. A clip assembly according to claim 6, wherein a primary joined state of the pin and main body with the attached member, a tip of the latching claw is engaged to the pin latching convex element and the pin shaft plane element to hold the pin against axial movement, and the attached member is held between a radially outward attaching base of the latching claw and the contact element.

10. A clip assembly according to claim 9, wherein:
the pin includes a sloping pin release leaf located radially outward of the pin shaft and axially below the pin flange;
the main body includes a release rib located radially between the ring element and the opening; and
in the primary joined state, the pin is rotatable relative to the main body to:
rotate the pin shaft plane out of engagement with the tip of the latching claw;
rotate the pin release element radially inward of the tip of the latching claw, thereby forcing the tip of the latching claw radially outward and releasing the tip from the pin latching convex element;
cause an axial camming interaction between the pin release leaf and the release rib that will pushing the pin axially upward; and
free the pin shaft for axially movement and permit the pin to the temporary joined state.

11. A clip assembly for installation in a through hole of a workpiece attached member from a top side of the attached member, the hole defining a perpendicular axis, and the clip comprising:
a pin including a pin shaft, and a pin flange extending radially from proximate a top end of the pin shaft and extending axially downward at an outer circumference of the pin flange and the pin further includes a cylindrical shaft top axially proximate to the pin flange, a shaft plane element located axially beneath the shaft top and circumferentially adjacent to a pin release element of a curved surface, and a cylindrical pin latching convex element located axially below the shaft plane element;
a main body including a bottom with an upper side and lower side and defining an opening for partial insertion of the pin, an annular loop projecting axially above the upper side of the bottom and surrounding the opening, and a sloping surface running radially outward and axially downward from a top of the annular loop to the bottom; and
the outer circumference of the pin flange defining a pin diameter, the sloping surface defining an inner diameter proximate the top of the annular loop and an outer diameter proximate to the bottom, and the pin diameter is greater than the inner diameter and less than the outer diameter.

12. A clip assembly according to claim 11 wherein the axis defines a horizontal plane perpendicular to the axis, and the sloping surface defines a first acute angle with the plane, and the outer circumference of the pin flange defines a second acute angle with the plane, and the second acute angle is greater than the first acute angle.

13. A clip assembly according to claim 11 wherein the base further includes a thin walled annular base flange surrounding the opening and projecting radially outward and axially downward a first axial distance and from the lower side of the bottom, and a contact element projecting axially downward a second axial distance from the lower side of the bottom, and the first axial distance is greater than the second axial distance; and
wherein a joined state of the clip assembly with the attached member, the contact element holds the bottom at the second distance from the top side of the attached member, and the base flange is compressed and splayed out between the bottom and the top side of the attached member.

14. A clip assembly according to claim 11, wherein the pin further includes:
a plurality of pin rotation regulating ribs located beneath the pin release element and arranged at equal circumferential intervals;
a pin taper element inward located between neighboring pin rotation regulating ribs and tapering axially downward and radially inward;
a narrow cylindrical pin thin shaft below the pin rotation regulating ribs; and
a cylindrical pin holding element below the pin thin shaft.

15. A clip assembly according to claim 14, wherein the base further includes:
a latching claw extending axially downward from and perpendicular to the lower side of the bottom, and
a support arm extending axially downward from and perpendicular to the lower side of the bottom.

16. A clip assembly according to claim 15, wherein the latching claw is engageable with the pin rotation regulating rib so as prevent free rotation of the pin relative to the main body.

17. A clip assembly according to claim 15, wherein a temporary joined state of the pin and the main body, a tip of the latching claw is engaged to the pin between the pin taper element and the pin holding element to resist unintentional axial movement of the pin within the main body.

18. A clip assembly according to claim 15, wherein a primary joined state of the pin and main body with the attached member, a tip of the latching claw is engaged to the pin latching convex element and the pin shaft plane element to hold the pin against axial movement, and the attached member is held between a radially outward attaching base of the latching claw and the contact element.

19. A clip assembly according to claim 18, wherein:
the pin includes a sloping pin release leaf located radially outward of the pin shaft and axially below the pin flange;
the main body includes a release rib located radially between the ring element and the opening; and
in the primary joined state, the pin is rotatable relative to the main body to:
rotate the pin shaft plane out of engagement with the tip of the latching claw;
rotate the pin release element radially inward of the tip of the latching claw, thereby forcing the tip of the latching claw radially outward and releasing the tip from the pin latching convex element;
cause an axial camming interaction between the pin release leaf and the release rib that will pushing the pin axially upward; and
free the pin shaft for axially movement and permit the pin to the temporary joined state.

20. A clip assembly for installation in a through hole of a workpiece attached member from a top side of the attached member, the hole defining a perpendicular axis, and the clip comprising:

a pin including a pin shaft, and a pin flange extending radially from proximate a top end of the pin shaft and extending axially downward at an outer circumference of the pin flange;

a main body including a bottom with an upper side and lower side and defining an opening for partial insertion of the pin, an annular loop projecting axially above the upper side of the bottom and surrounding the opening, and a sloping surface running radially outward and axially downward from a top of the annular loop to the bottom, a thin walled annular base flange surrounding the opening and projecting radially outward and axially downward a first axial distance from the lower side of the bottom, and a contact element projecting axially downward a second axial distance from the lower side of the bottom, and the first axial distance is greater than the second axial distance;

wherein the axis defines a horizontal plane perpendicular to the axis, and the sloping surface defines a first acute angle with the plane, and the outer circumference of the pin flange defines a second acute angle with the plane, and the second acute angle is greater than the first acute angle;

wherein the outer circumference of the pin flange defines a pin diameter, the sloping surface defines an inner diameter proximate the top of the annular loop and an outer diameter proximate to the bottom, and the pin diameter is greater than the inner diameter and less than the outer diameter; and wherein a joined state of the clip assembly with the attached member, the contact element holds the bottom at the second distance from the top side of the attached member, and the base flange is compressed and splayed out between the lower side of the main body bottom and the top side of the attached member.

* * * * *